(12) United States Patent
Grosch et al.

(10) Patent No.: US 10,704,458 B2
(45) Date of Patent: Jul. 7, 2020

(54) METHODS AND SYSTEMS FOR A TURBOCHARGER

(71) Applicant: Ford Global Technologies, LLC, Dearborn, MI (US)

(72) Inventors: Guenter Grosch, Vettweiss (DE); Andreas Kuske, Geulle (NL); Franz A. Sommerhoff, Aachen (DE); Rainer Lach, Wuerselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

(21) Appl. No.: 16/115,413

(22) Filed: Aug. 28, 2018

(65) Prior Publication Data

US 2019/0107044 A1 Apr. 11, 2019

(30) Foreign Application Priority Data

Oct. 6, 2017 (DE) .......................... 10 2017 217 759

(51) Int. Cl.

| *F02B 37/04* | (2006.01) |
|---|---|
| *F02B 37/14* | (2006.01) |
| *F02D 41/00* | (2006.01) |
| *F02B 39/10* | (2006.01) |
| *F02B 37/16* | (2006.01) |

(52) U.S. Cl.
CPC .............. *F02B 37/04* (2013.01); *F02B 37/14* (2013.01); *F02B 37/164* (2013.01); *F02B 39/10* (2013.01); *F02D 41/0007* (2013.01)

(58) Field of Classification Search
CPC ........ F02B 37/04; F02B 37/14; F02B 37/164; F02B 39/10; F02D 41/0007
See application file for complete search history.

(56) References Cited

U.S. PATENT DOCUMENTS

| 3,829,235 | A | * | 8/1974 | Woollenweber, Jr. ....................... F04D 25/16 415/143 |
|---|---|---|---|---|
| 4,350,135 | A | * | 9/1982 | Casey ..................... F02B 33/36 123/564 |
| 5,544,486 | A | | 8/1996 | Lu |
| 5,791,315 | A | * | 8/1998 | Riach ...................... F02B 33/36 123/564 |
| 6,651,431 | B1 | * | 11/2003 | Yang ....................... F01D 9/026 123/559.1 |
| 6,802,184 | B2 | | 10/2004 | Huter et al. |
| 6,905,535 | B2 | * | 6/2005 | Keefer ................. B01D 53/047 95/101 |
| 6,922,996 | B2 | | 8/2005 | Ellmer et al. |

(Continued)

FOREIGN PATENT DOCUMENTS

| DE | 10019774 A1 | 11/2001 |
|---|---|---|
| DE | 10038244 A1 | 3/2002 |

(Continued)

*Primary Examiner* — Jesse S Bogue
(74) *Attorney, Agent, or Firm* — Geoffrey Brumbaugh; McCoy Russell LLP (57) ABSTRACT

Methods and systems are provided for a compressor of an exhaust-gas turbocharger. In one example, a system may include where a housing of the compressor comprises two outlets, a first outlet shaped to direct compressed air to an electrically driveable compressor and a second outlet shaped to bypass compressed air around the electrically driveable compressor.

20 Claims, 5 Drawing Sheets

(56) References Cited

U.S. PATENT DOCUMENTS

| | | | |
|---|---|---|---|
| 6,938,420 B2* | 9/2005 | Kawamura | F02B 33/34 60/612 |
| 7,269,950 B2* | 9/2007 | Pedersen | F01D 17/14 417/406 |
| 7,644,586 B2 | 1/2010 | Yamagata | |
| 8,118,543 B2* | 2/2012 | Umeyama | F04D 29/464 415/150 |
| 8,141,357 B2 | 3/2012 | Yamagata et al. | |
| 8,147,186 B2* | 4/2012 | Ibaraki | F04D 29/4206 415/148 |
| 9,187,073 B2* | 11/2015 | Kim | F02M 35/10229 |
| 9,322,362 B2 | 4/2016 | Lim et al. | |
| 10,132,252 B2* | 11/2018 | Park, II | F02B 37/10 |
| 10,208,693 B2* | 2/2019 | Xiao | F02B 37/183 |
| 10,227,938 B2* | 3/2019 | Yu | F02D 41/18 |
| 10,273,908 B2* | 4/2019 | Lee | F01N 13/107 |
| 2011/0083647 A1* | 4/2011 | Hansen | F02B 33/44 123/564 |
| 2017/0159580 A1* | 6/2017 | Han | F02D 17/02 |
| 2017/0254258 A1* | 9/2017 | Martin | F02B 39/10 |
| 2017/0254277 A1* | 9/2017 | Yoshizawa | F02B 37/04 |
| 2017/0335753 A1* | 11/2017 | Xiao | F02B 37/04 |
| 2018/0163616 A1* | 6/2018 | Han | F02D 41/0007 |
| 2019/0003373 A1* | 1/2019 | Regner | F02B 25/08 |

FOREIGN PATENT DOCUMENTS

| | | |
|---|---|---|
| DE | 10261790 A1 | 7/2004 |
| DE | 102007055507 A1 | 6/2009 |
| DE | 102010027220 A1 | 1/2012 |
| EP | 3133289 A1 | 2/2017 |
| WO | 2009065394 A1 | 5/2009 |

* cited by examiner

METHODS AND SYSTEMS FOR A TURBOCHARGER

CROSS REFERENCE TO RELATED APPLICATION

This application claims priority to German Patent Application No. 102017217759.4, filed Oct. 6, 2017. The entire contents of the above-referenced application are hereby incorporated by reference in its entirety for all purposes.

FIELD

The present disclosure relates generally to an engine comprising a turbocharger comprising a compressor shaped to be at least partially driven by an electric motor.

BACKGROUND/SUMMARY

Internal combustion engines may be equipped with a supercharging arrangement, wherein supercharging may provide a method for increasing power, in which the charge air used for the combustion process in the engine is compressed, as a result of which a greater mass of charge air can be supplied to each cylinder per working cycle. In this way, the fuel mass and therefore the mean pressure can be increased.

Supercharging is a suitable method for increasing the power of an internal combustion engine while maintaining an unchanged swept volume, or for reducing the swept volume while maintaining the same power. In many cases, supercharging leads to an increase in volumetric power output and a more expedient power-to-weight ratio. If the swept volume is reduced, it is possible, given the same vehicle boundary conditions, to shift the load collective toward higher loads, at which the specific fuel consumption is lower. Supercharging of an internal combustion engine consequently assists may increase engine efficiency and decrease fuel consumption.

Some transmission configurations may provide downspeeding, whereby a lower specific fuel consumption is likewise achieved. In the case of downspeeding, use is made of the fact that a specific fuel consumption at low engine speeds is generally lower, in particular in the presence of relatively high loads.

Supercharging may be provided via an exhaust-gas turbocharger, in which a compressor and a turbine are arranged on the same shaft. The hot exhaust-gas flow may be fed to and expand in the turbine with a release of energy, as a result of which the shaft is set in rotation. The energy supplied by the exhaust-gas flow to the shaft is used for driving the compressor which is likewise arranged on the shaft. The compressor delivers and compresses the charge air supplied to it, as a result of which supercharging of the at least one cylinder is obtained. A charge-air cooler may be provided in the intake system downstream of the compressor, wherein the charge-air cooler may cool the compressed air before directed the compressed air to one or more engine cylinders. The cooler lowers the temperature and thereby increases the density of the charge air, such that the cooler also contributes to improved charging of the cylinders, that is to say to a greater air mass. In effect, compression by cooling occurs.

A difference of an exhaust-gas turbocharger in relation to a supercharger, wherein the supercharger utilizes an auxiliary device to drive the compressor, may include that an exhaust-gas turbocharger utilizes the exhaust-gas energy of the hot exhaust gases, whereas a supercharger draws the energy used for driving it directly or indirectly from the internal combustion engine and thus adversely affects, that is to say reduces, the efficiency, at least for as long as the drive energy does not originate from an energy recovery source.

If the supercharger is not one that can be driven by means of an electric machine, that is to say electrically, a mechanical or kinematic connection for power transmission may be arranged between the supercharger and the internal combustion engine.

The advantage of a supercharger in relation to an exhaust-gas turbocharger consists in that the supercharger can generate, and make available, a desired charge pressure at a greater range of engine operating conditions. That is to say, the supercharger may provide a desired charge pressure regardless of the operating state of the internal combustion engine, in particular regardless of the present rotational speed of the crankshaft. This applies in particular to a supercharger which can be driven electrically via an electric machine.

In previous examples, it is specifically the case that difficulties may be encountered in achieving an increase in power in some engine speed ranges via exhaust-gas turbocharging. A torque drop may observed in the event of a certain engine speed being undershot. Said torque drop is understandable if one takes into consideration that the charge pressure ratio is dependent on the turbine pressure ratio. If the engine speed is reduced, this leads to a smaller exhaust-gas mass flow and therefore to a lower turbine pressure ratio. Consequently, toward lower engine speeds, the charge pressure ratio may likewise decrease. This may result in a torque drop. It can be sought, using a variety of measures, to improve the torque characteristic of a supercharged internal combustion engine.

The internal combustion engine to which the present disclosure relates has at least one exhaust-gas turbocharger and an electrically driveable compressor.

The electrically driveable compressor is in this case shaped as an activatable compressor which is activated when desired to assist an exhaust-gas turbocharger in compressing the charge air. In the context of the present disclosure, provision is not made for using the electrically driveable compressor instead of the exhaust-gas turbocharging arrangement to generate the charge pressure. According to the disclosure, the electric drive compressor is arranged in the intake system downstream of the compressor of the at least one exhaust-gas turbocharger, and, in the context of a multi-stage compression or supercharging configuration, compresses charge error that has already been pre-compressed. That is to say, the exhaust-gas turbocharger may compress charge-air before the electrically driveable compressor.

According to some examples, for the purposes of bypassing the electrically driveable compressor, a bypass line may branch off from the intake system, with the formation of a first junction, between the electrically driveable compressor and the compressor of the at least one exhaust-gas turbocharger and which opens into the intake system, with the formation of a second junction, downstream of the electrically driveable compressor and in which a shut-off element is arranged.

In this way, the line system on the inlet side of the internal combustion engine, that is to say the intake system, is more complex than if bypassing lines were omitted. If the lines of the intake system are shortened, a line system is obtained which has small radii of curvature, at which the charge-air flow may be intensely deflected several times, possibly resulting in pressure losses in the charge-air flow, which may be disadvantageous and correspond to parasitic power losses. By contrast, a line system with less frequent and less intense diversion of the charge-air flow results in an intake system of relatively large volume, which comprises a sizing equal to a desired size for optimal efficiency and thus opposes the densest possible packaging of the drive unit in the engine bay of the vehicle.

The configuration of the intake system generally becomes more complex if an exhaust-gas recirculation arrangement is provided for recirculating exhaust gases from the outlet side to the inlet side.

The inventors have found a solution to at least partially solve the problems described above associated with exhaust-gas turbochargers and electrically driven compressors. In one example, the problems are at least partially solved by a supercharged internal combustion engine that comprises an intake system for the supply of charge air, an exhaust-gas discharge system for the discharge of exhaust gas, at least one exhaust-gas turbocharger which comprises a turbine arranged in the exhaust-gas discharge system and a compressor arranged in the intake system, the compressor being equipped with at least one impeller which is arranged on a rotatable shaft in a compressor housing, and the compressor housing having a charge-air-conducting flow duct which proceeds from an inlet region of the compressor and extends as far as downstream of the at least one impeller, and an electrically driveable compressor, which is arranged in the intake system downstream of the compressor of the at least one exhaust-gas turbocharger, wherein the compressor housing for the compressor of the exhaust-gas turbocharger has at least two outlet regions, the charge-air-conducting flow duct splitting downstream of the at least one impeller into at least two arm-like duct branches, and in each case one arm-like duct branch opening into an outlet region, a first outlet region being connected via the intake system to the electrically driveable compressor, and the second outlet region being connected via the intake system, bypassing the electrically driveable compressor, to the intake system downstream of the electrically driveable compressor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
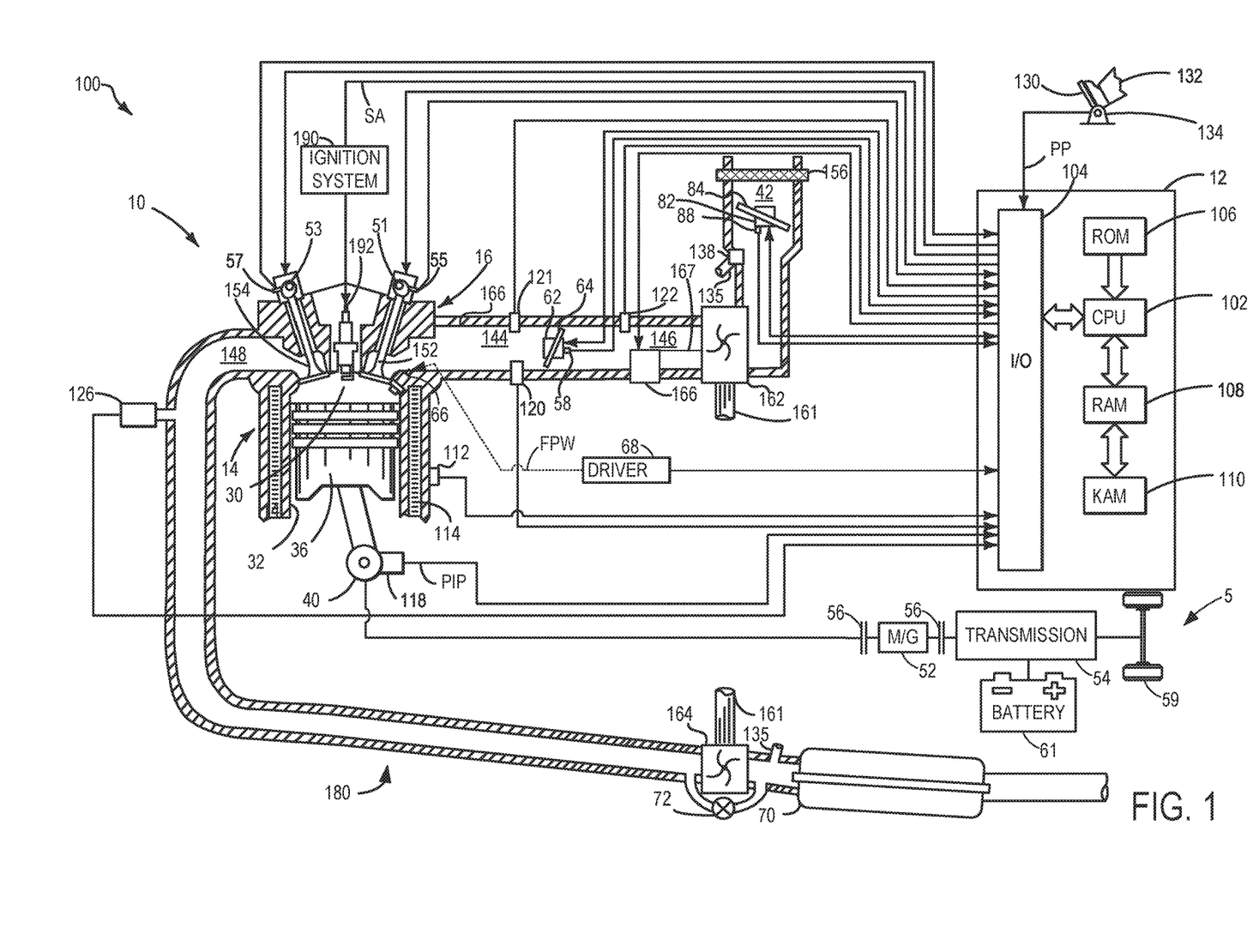
FIG. 1 shows an engine arranged in a hybrid vehicle.
Figure 2A:
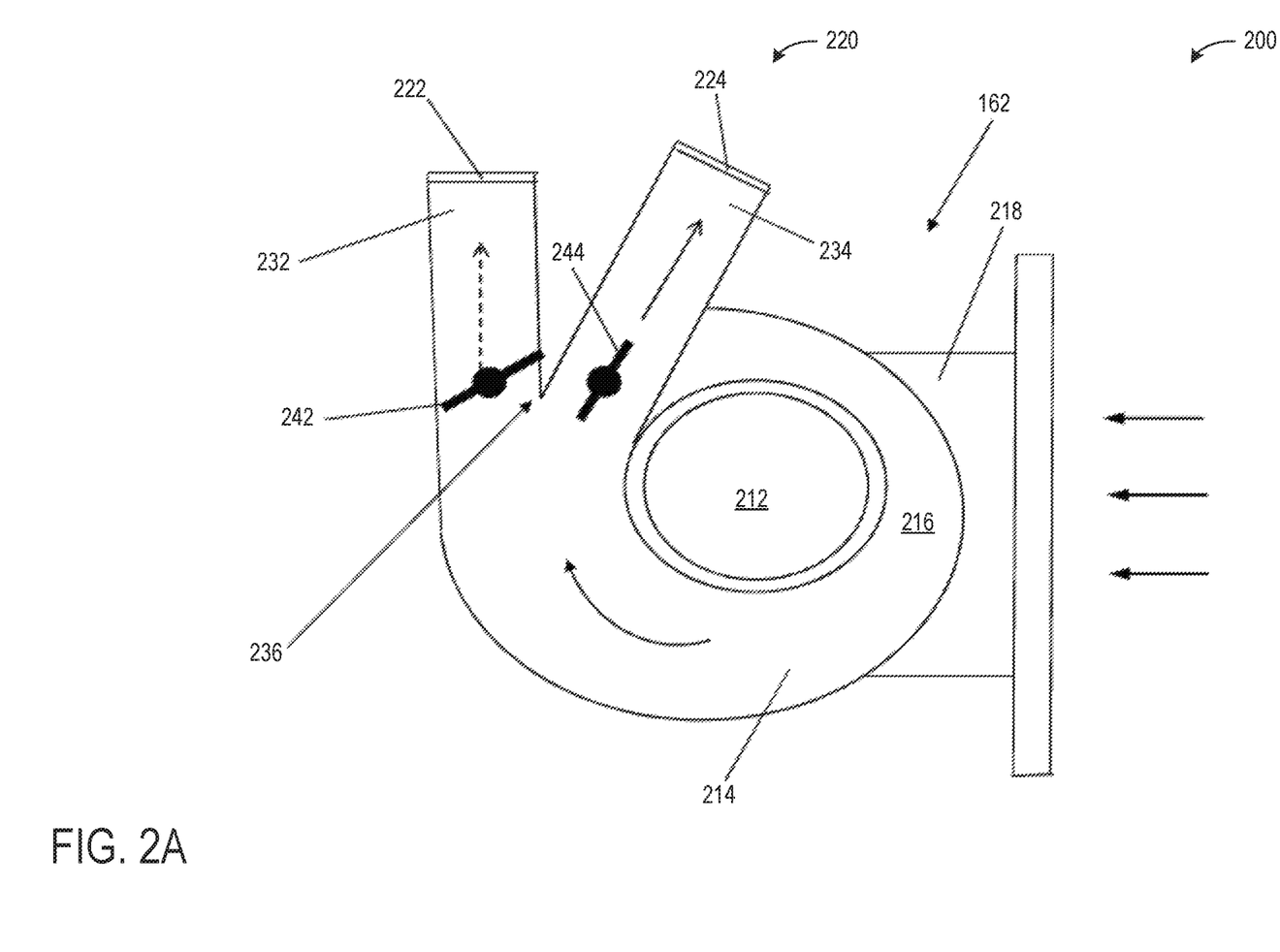
FIG. 2A shows a first embodiment of a housing of a compressor of an exhaust gas turbocharger.
Figure 2B:
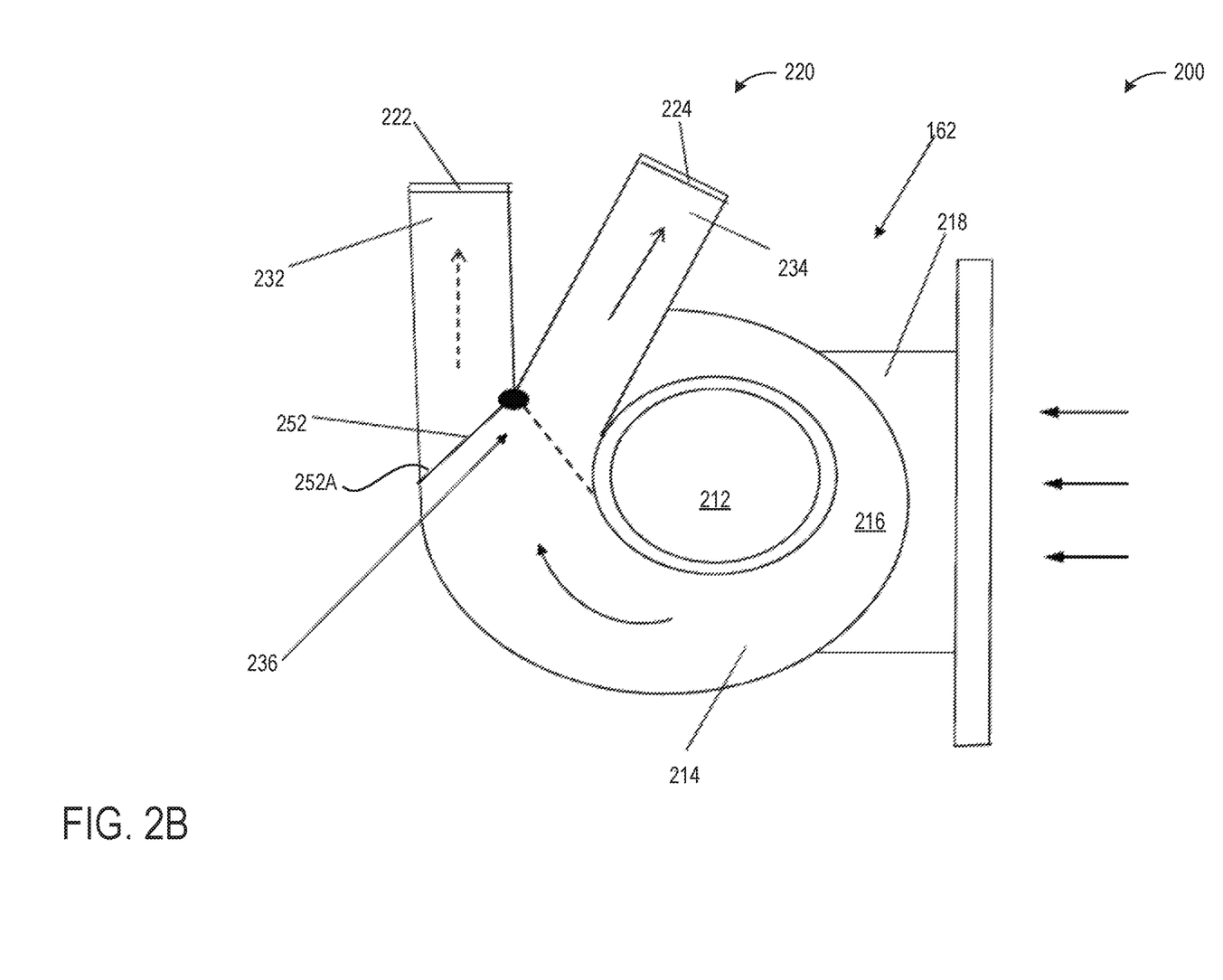
FIG. 2B shows a second embodiment of the housing of the compressor of the exhaust gas turbocharger

The following description relates to systems and methods for utilizing one or more compressors for providing boost. Additionally, the description further describes a shape of a compressor housing for a compressor of an exhaust-gas turbocharger, wherein the shape of the compressor housing reduces packaging constraints. More specifically, the compressor housing may comprise at least two outlets, wherein a first outlet may direct compressed air to the electrically driveable compressor and a second outlet may direct compressed air around the electrically driveable compressor to a bypass. The compressors may be arranged upstream of an engine arranged in a hybrid vehicle, as shown in FIG. 1. The compressor may comprise a plurality of shut-off elements for adjusting compressed air flow through each of its outlets, as shown in FIG. 2A. Additionally or alternatively, the compressor may comprise a single shut-off element for adjusting compressed air flow through each of its outlets, as shown in FIG. 2B. An example arrangement of the compressor of the exhaust-gas turbocharger and the electrically driveable compressor is shown in FIG. 3.

Figure 4:
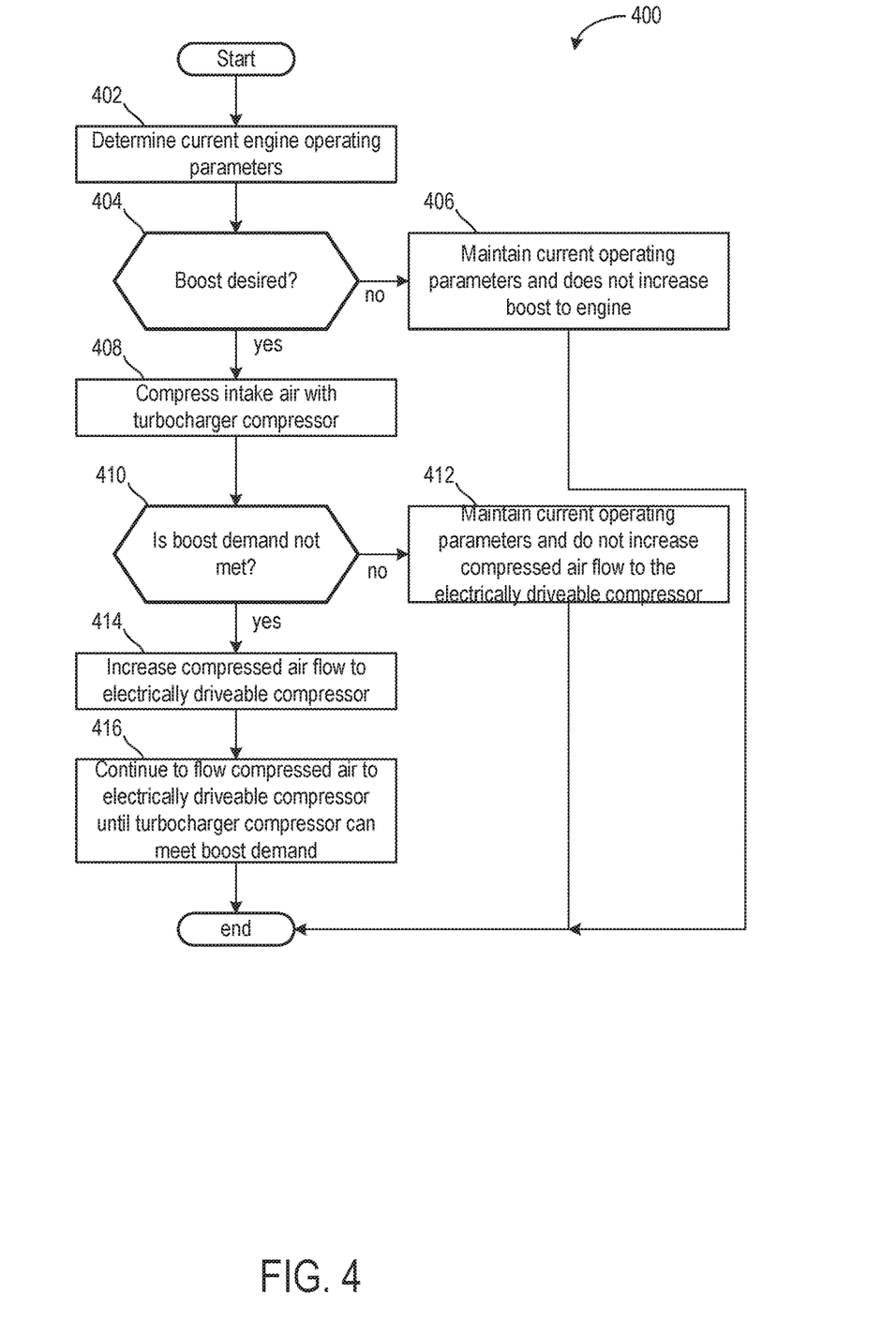
FIG. 4 shows a method for adjusting compressed air flow to the electrically driveable compressor.

A method for meeting a boost demand with one or more of the compressor of the exhaust-gas turbocharger and the electrically driveable compressor is shown in FIG. 4. In some examples, to preserve a battery state of charge and increase fuel economy, the electrically driveable compressor may be activated during engine conditions where the compressor of the exhaust-gas turbocharger may not be able to meet the boost demand independently.

Figure 3:
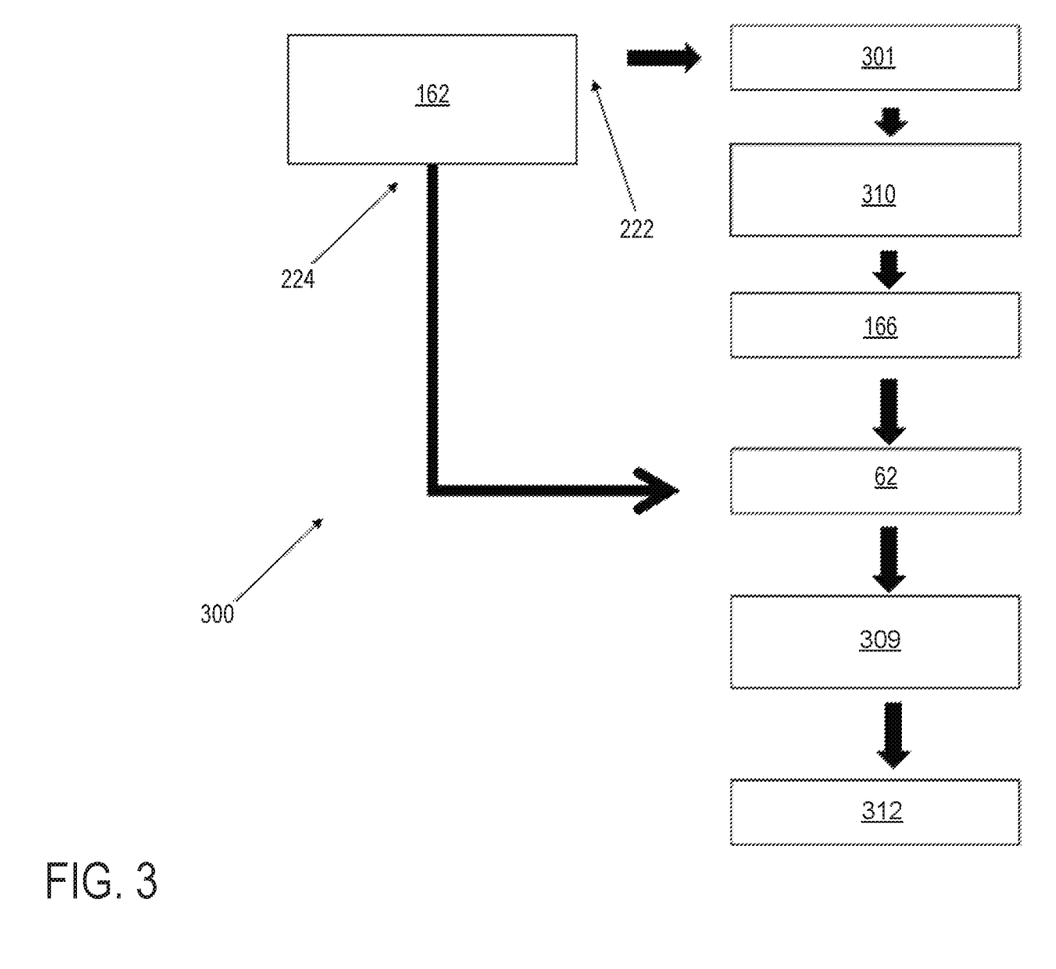
FIG. 3 shows an optional arrangement of the exhaust-gas turbocharger and an electrically driven compressor in an intake system, which may be used with the engine of FIG. 1.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In the case of the internal combustion engine according to the disclosure, the intake system in the form of the charge-air-conducting flow duct branches already in the compressor housing, specifically downstream of the at least one impeller. For this purpose, the compressor housing according to the disclosure has at least two ports downstream of the at least one impeller; the so-called outlet regions.

The charge air enters the compressor housing via the inlet region, is compressed as it flows through the at least one impeller, and exits the housing either via a first arm-like duct branch and a first outlet region or via a second arm-like duct branch and a second outlet region. The first arm-like duct branch conducts the pre-compressed charge air via the intake system to the electrically driveable compressor. The second duct branch conducts the compressed charge air via the intake system into the intake system downstream of the electrically driveable compressor, whereby the electrically driveable compressor is bypassed.

The arrangement of the compressor housing according to the disclosure has multiple advantageous effects.

A conventional bypass line, which branches off from the intake system, with the formation of a first junction, between the electrically driveable compressor and the compressor of the at least one exhaust-gas turbocharger and which opens into the intake system, with the formation of a second junction, downstream of the electrically driveable compressor and in which a shut-off element is arranged, is omitted. The bypassing of the electrically driveable compressor is realized using the second duct branch or the second outlet region. A shut-off element provided in the housing can serve for opening up and shutting off the second duct branch, that is to say for activating and deactivating said second duct branch.

As a result of the branching of the intake system in the compressor housing, the inlet-side line system of the internal combustion engine, that is to say the intake system, is made less luminous, whereby a packaging constraint is correspondingly reduced. Dense packaging is thus assisted, and the weight of the inlet-side line system is likewise reduced. The pressure losses in the charge-air flow can be reduced. As a result of the omission of a conventional bypass line together with bypass valve, the total length of the inlet-sidelines of the intake system is also shortened, whereby the response behavior of the supercharging arrangement may be increased. That is to say, there may be fewer pipes and/or tubes for the compressed air to fill, which may increase power output and efficiency. Furthermore, a manufacturing cost for the intake system are reduced, specifically inter alia as a result of a reduced use of material for the lines and reduced assembly effort during the manufacturing process.

With the internal combustion engine according to the disclosure, a supercharged internal combustion engine is provided which exhibits improved packaging and is less expensive.

A compressor housing according to the disclosure may also have, downstream of the at least one impeller, three or more ports or outlet regions, for example a third port, that is to say a third outlet region, which connects the compressed charge air to the cylinders of the internal combustion engine, bypassing the electrically driveable compressor and bypassing a charge-air cooling arrangement provided in the intake system. The latter may be desired for example during a warm-up phase after a cold start.

Embodiments of the supercharged internal combustion engine may comprise where the compressor housing has two outlet regions, the charge-air-conducting flow duct splitting downstream of the at least one impeller into two arm-like duct branches, with a junction being formed, and a first arm-like duct branch opening into the first outlet region and a second arm-like duct branch opening into the second outlet region.

Embodiments of the supercharged internal combustion engine may comprise where each arm-like duct branch may be equipped with a shut-off element, the respective shut-off element serving for opening up and shutting off the associated duct branch.

If the compressor housing has two outlet regions, embodiments of the supercharged internal combustion engine may also comprise where a common shut-off element is provided for the two arm-like duct branches, said common shut-off element opening up the first arm-like duct branch when said common shut-off element shuts off the second duct branch, and vice versa.

In this context, embodiments of the supercharged internal combustion engine may comprise where the common shut-off element is a pivotable flap arranged at the junction.

Embodiments of the supercharged internal combustion engine may comprise where an intercooler is arranged in the intake system between the electrically driveable compressor and the compressor of the at least one exhaust-gas turbocharger.

The intercooler lowers the air temperature upstream of the inlet of the electrically driveable compressor, whereby the temperature and the pressure at the outlet of the electrically driveable compressor are likewise lowered.

Embodiments of the supercharged internal combustion engine may comprise where the intake system is equipped with a throttle element which is arranged downstream of the electrically driveable compressor and downstream of the compressor of the at least one exhaust-gas turbocharger.

In the case of an applied-ignition internal combustion engine, that is to say an Otto-cycle engine, the adjustment of the desired power may be performed through variation of the charge of the combustion chamber, that is to say via quantity regulation. By adjusting a throttle element, for example a throttle flap, provided in the intake tract, the pressure of the delivered charge air downstream of the throttle element can be reduced to a greater or lesser extent. For a constant combustion chamber volume, it is possible in this way for the air mass, that is to say the quantity, to be set by means of the pressure of the charge air.

Embodiments of the supercharged internal combustion engine may comprise where the intake system is equipped with a charge-air cooler which is arranged downstream of the electrically driveable compressor and downstream of the compressor of the at least one exhaust-gas turbocharger.

The charge-air cooler lowers the air temperature and thereby increases the density of the compressed charge air upstream of the inlet into the cylinders, as a result of which the cooler also contributes to improved charging of the combustion chamber with air, that is to say to a greater air mass.

If, in addition to the charge-air cooler, a throttle element is also arranged downstream of the electrically driveable compressor and downstream of the compressor of the at least one exhaust-gas turbocharger, embodiments of the supercharged internal combustion engine may comprise where the charge-air cooler is arranged downstream of the throttle element.

Embodiments of the supercharged internal combustion engine may comprise where the compressor housing has, in the inlet region, a flange for fastening purposes.

Embodiments of the supercharged internal combustion engine may comprise where the electrically driveable compressor is designed to be smaller than the compressor of the at least one exhaust-gas turbocharger.

This is advantageous in particular with regard to the function according to the disclosure of the electrically driveable compressor, which is designed as an activatable compressor and which, in the context of a multi-stage compression, compresses charge air that has already been pre-compressed. Here, the electrically driveable compressor functions as a high-pressure stage.

Embodiments of the supercharged internal combustion engine may comprise where only one exhaust-gas turbocharger is provided. This reduces the weight and costs of the supercharging arrangement.

It is then generally the case that single-stage supercharging or compression takes place in defined characteristic map areas of the internal combustion engine. With regard to friction losses and overall efficiency, it is more advantageous to use a single exhaust-gas turbocharger than multiple turbochargers, for which reason the above embodiment has advantages in terms of efficiency.

Embodiments may comprise where the compressor of the at least one exhaust-gas turbocharger is equipped with a variable compressor geometry. A variable compressor geometry has proven to be advantageous in particular if only a small exhaust-gas flow rate is conducted through the turbine because, by adjustment of the guide blades, the surge limit of the compressor in the compressor characteristic map can be shifted in the direction of small compressor flows, and thus the compressor is prevented from operating beyond the surge limit. The variable compressor geometry therefore also offers advantages if high exhaust-gas flow rates are branched off upstream of the turbine and recirculated, in order to realize high recirculation rates. If the turbine of the at least one exhaust-gas turbocharger has a variable turbine geometry, the variable compressor geometry can be adapted continuously to the turbine geometry.

With targeted configuration of the supercharging, it is possible to obtain advantages not only with regard to the fuel consumption, that is to say the efficiency of the internal combustion engine, but also with regard to exhaust-gas emissions. With suitable supercharging for example of a diesel engine, the nitrogen oxide emissions can therefore be reduced without any losses in efficiency. At the same time, the hydrocarbon emissions can be positively influenced. The emissions of carbon dioxide, which correlate directly with fuel consumption, decrease in any case with falling fuel consumption.

To comply with future limit values for pollutant emissions, however, further measures are desired. Here, the focus of the development work is on, inter alia, the reduction of nitrogen oxide emissions, which are of high relevance in particular in diesel engines. Exhaust-gas recirculation is expedient here.

The exhaust gas can be extracted from the exhaust-gas discharge system upstream of the turbine and recirculated via high-pressure exhaust-gas recirculation. However, in the event of an increase in the exhaust-gas recirculation rate, the exhaust-gas flow introduced into the turbine simultaneously decreases. The reduced exhaust-gas mass flow through the turbine leads to a lower turbine pressure ratio, as a result of which the charge pressure ratio also falls, which equates to a smaller compressor mass flow. Aside from the decreasing charge pressure, problems may additionally arise in the operation of the compressor with regard to the surge limit. Disadvantages may also arise in terms of the pollutant emissions, for example with regard to the formation of soot during an acceleration in the case of diesel engines.

For this reason, the exhaust gas may also be recirculated by means of low-pressure EGR. By contrast to the above-mentioned high-pressure EGR arrangement, in which exhaust gas is extracted from the exhaust-gas discharge system upstream of the turbine and introduced into the intake system downstream of a compressor, in the case of a low-pressure EGR arrangement exhaust gas which has already flowed through the turbine is recirculated to the inlet side. For this purpose, the low-pressure EGR arrangement comprises a recirculation line which branches off from the exhaust-gas discharge system downstream of the turbine and which opens into the intake system upstream of the compressor.

In some embodiments, additionally or alternatively, a method for operating a supercharged internal combustion engine in which the compressor housing has two outlet regions, the charge-air-conducting flow duct splitting downstream of the at least one impeller into two arm-like duct branches, with a junction being formed, and a first arm-like duct branch opening into the first outlet region and a second arm-like duct branch opening into the second outlet region, may comprise where the first arm-like duct branch is opened up and the second arm-like duct branch is shut off in order to compress the charge air in multi-stage fashion using the electrically driveable compressor.

Additionally or alternatively, the method may optionally include where the first arm-like duct branch is shut off and the second arm-like duct branch is opened up in order to bypass the electrically driveable compressor in the course of the supercharging.

An internal combustion engine, such as the engine described above, is used as a motor vehicle drive unit. Within the context of the present disclosure, the expression internal combustion engine may encompass diesel engines and Otto-cycle engines, but also hybrid internal combustion engines, that is to say internal combustion engines which are operated with a hybrid combustion process, and hybrid drives which, in addition to the internal combustion engine, comprise at least one further torque source for driving the motor vehicle, for example an electric machine which is connectable in terms of drive or connected in terms of drive to the internal combustion engine and which outputs power instead of the internal combustion engine or in addition to the internal combustion engine.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore 20, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore 20 may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

The injector 66 may be shaped to flow a mixture of liquids and/or gases through one or more of its passages to be injected into the combustion chamber 30. The mixture may include one or more of alcohol, different octane rated fuels, diesel, cleaners, catalysts, and the like.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

An electrically driveable compressor 166 may be arranged downstream of the compressor 162 in the intake boost chamber 146. As shown, the compressor 162 may comprise at least two outlets, a first outlet leading to the electrically driveable compressor 166 and the second outlet bypassing the electrically driveable compressor 166. Thus, the intake boost chamber 146 may be divided into at least two portions via partition 167, while maintaining a same relative volume as previous examples, thereby reducing pressure losses which may be incurred due to compressed air entering volumes of pipes forming auxiliary passages. As will be described in greater detail below, the compressor housing of the compressor 162 of the exhaust-gas turbocharger may be shaped to decrease a volume of materials used to arrange the intake system of engine 10 in such a way that pressure losses resulting from compressed gas filling piping for directing air to a bypass, charge-air cooler, electrically driveable compressor, or the like are mitigated and/or prevented. This may result in increased fuel economy and increased power output.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 59. Electric machine 52 may also be operated as a generator to provide electrical power to charge battery 58, for example during a braking operation.

The controller 12 receives signals from the various sensors of FIG. 1 and employs the various actuators of FIG. 1 to adjust engine operation based on the received signals and instructions stored on a memory of the controller. For example, adjusting operation of the fuel injector 66 may include signaling to an actuator of the injector to inject more or less fuel.

Turning now to FIG. 2A, it schematically shows an embodiment 200 of the compressor 162 arranged in an exhaust-gas turbocharger. The exhaust-gas turbocharger may further include the turbine 164 of FIG. 1. As such, components previously introduced may be similarly numbered in subsequent figures. As described above, the turbine and compressor 162 may be arranged on a shared shaft (shaft 161 of FIG. 1), wherein exhaust gas may flow through the turbine, and the shaft may transfer the energy imparted from the exhaust gas to the turbine to the compressor 162, which may compress charge air.

More specifically, the hot exhaust gas may expand in the turbine with a release of energy, and drive the compressor 162 via rotation of the shaft. The compressor 162 compresses the charge air which is supplied to the cylinders via an intake boost chamber (e.g. intake boost chamber 146 of FIG. 1), as a result of which the supercharging of the internal combustion engine is realized.

The compressor 162 may be equipped with an impeller 212 arranged on a rotatable shaft, which impeller is arranged in a compressor housing 214. The compressor housing 214 may comprise a charge-air-conducting flow duct 216 which proceeds from an inlet region 218 of the compressor 162 and extends downstream of the impeller 212.

The compressor housing 214 may comprise a plurality of outlets 220 including a first outlet 222 and a second outlet 224. The charge-air-conducting flow duct 216 may divide downstream of the impeller 212, upstream of the plurality of outlets 220, forming a first arm-like duct branch 232 and a second arm-like duct branch 234. A junction 236 may be formed between the first and second arm-like duct branches 232, 234. Each of the first and second arm-like duct branches 232, 234 may be fluidly coupled to one outlet of the plurality of outlets 220. In the example of FIG. 2A, the first arm-like duct branch 232 is fluidly coupled to the first outlet 222 and the second arm-like duct branch 234 is fluidly coupled to the second outlet 224. Compressed air in the first arm-like duct branch 232 may not flow to the second outlet 224 or mix with compressed air in the second arm-like duct branch 234. Similarly, compressed air in the second arm-like duct branch 234 may not flow to the first outlet 222 or mix with compressed air in the first arm-like duct branch 232.

The first outlet 222 is connected via the intake boost chamber to an electrically driveable compressor, such as the electrically driveable compressor 166 of FIG. 1. The second outlet 224 may be fluidly coupled to a portion of intake passage 42 which is sealed from the electrically driveable compressor 166. As such, compressed air in the second outlet 224 may bypass the electrically driveable compressor, to the engine downstream of the electrically driveable compressor (e.g., engine 10 of FIG. 1).

Each of the first and second arm-like duct branches 232, 234 may be equipped with a dedicated shut-off element 242, 244, the respective shut-off elements 242, 244 serving for opening up and shutting off the associated duct branch 232, 234. More specifically, the first arm-like duct branch 232 may comprise a first shut-off element 242 and the second arm-like duct branch 234 may comprise a second shut-off element 244. Each of the first and second shut-off elements 242, 244 may be a butterfly valve. However, it will be appreciated that other flow adjusting devices may be used without departing from the scope of the present disclosure.

Turning now to FIG. 2B, it schematically shows an embodiment 250 of the compressor 162 of an exhaust-gas turbocharger. The embodiment 250 of the exhaust-gas turbocharger may be substantially similar to the embodiment 200 of FIG. 2A. More specifically, the embodiment 250 differs from the embodiment 200 in that the embodiment 250 comprises a single shut-off element 252 arranged at the junction 236 between the first and second arm-like ducts 232, 234.

The single shut-off element 252 may be a flap or the like, wherein the single shut-off element may be shaped to adjust compressed air flow to each of the first and second arm-like ducts 232, 234. As such, when the single shut-off element 252 is actuated to a position fully sealing one of the arm-like ducts, then the other arm-like duct may receive a maximum amount of compressed air for a given compressor 162 speed. For example, if the single shut-off element 252 is actuated to a position to fully close the first arm-like duct 232 (such as the position shown by solid line 252A), then all the compressed air produced by the compressor 162 of the exhaust-gas turbocharger may flow to the second arm-like duct 234, thereby bypassing the electrically driveable compressor. As another example, if the single shut-off element 252 is actuated to a position to fully closed the second arm-like duct 234 (such as the position show by dashed line 252B), then all the compressed air produced by the compressor 162 of the exhaust gas turbocharger may flow to the first arm-like duct 232, thereby flowing the compressed air to the electrically driveable compressor for further compression.

In some examples, the compressor of the exhaust-gas turbocharger may comprise more than two outlets. In one example, the compressor may comprise three outlets, wherein the first outlet directs compressed air to the electrically driveable compressor, the second outlet directs compressed air to the bypass, and a third outlet directs compressed air to a charge-air cooler. As such, compressed air flowing to the charge-air cooler may not flow to the electrically driveable compressor while still increasing boost pressure via compression by cooling. Relative to the example of FIG. 1, the charge-air cooler may be arranged adjacent to the electrically driveable compressor 166 and the bypass passage, such that packaging restraints are decreased and pressure losses due to extra piping used in previous examples to conduct compressed air flow to desired locations is also decreased.

Turning now to FIG. 3, it schematically shows an embodiment 300 of an intake system 301 of the embodiments 200 or 250 of FIGS. 2A and 2B, respectively.

The compressor housing (e.g., compressor housing 214 of FIGS. 2A and 2B) of the compressor 162 arranged in the intake system 301 comprises first and second outlets 222, 224, the first outlet 222 being connected via the intake system 301 to the electrically driveable compressor 166, and the second outlet region 224 being connected, bypassing the electrically driveable compressor 166, to a portion of the intake system 1 downstream of the electrically driveable compressor 7.

In the example of FIG. 3, an intercooler 310 is arranged in the intake system 301 between the electrically driveable compressor 166 and the compressor 162 of the exhaust-gas turbocharger. The intercooler 310 may lower the temperature of the pre-compressed charge air upstream of the inlet into the electrically driveable compressor 166, whereby the temperature and the pressure at the outlet of the electrically driveable compressor 166 are also lowered, and the electrically driveable compressor 166 is protected against damage resulting from thermal overloading.

Furthermore, the intake system 301 is equipped with a throttle 62 which is arranged downstream of the electrically driveable compressor 166 and downstream of the compressor 162 of the exhaust-gas turbocharger. By adjusting the throttle 62, the charge-air quantity supplied to cylinders 312 can be adjusted, wherein cylinders 312 may include combustion chamber 30 of FIG. 1.

Furthermore, a charge-air cooler 309 may be arranged downstream of the throttle 62. The charge-air cooler 309 may lower the air temperature and thereby increase the density of the compressed charge air upstream of the inlet into the cylinders 312, as a result of which said cooler 309 also contributes to increase charging of the cylinders 312.

As described above, the compressor housing may be shaped differently to provide a desired number of outlets corresponding to a desired number of flow paths, wherein each of the flow paths may be fluidly sealed from one another. Additionally or alternatively, one or more of the charge-air cooler 309 and/or the intercooler 310 may be omitted.

Turning now to FIG. 4, it shows a method 400 for adjusting compressed air flow to the electrically driveable compressor.

The method 400 begins at 402, which includes determining, estimating, and/or measuring current engine operating parameters. Current engine operating parameters may include, but are not limited to, one or more of manifold pressure, boost, engine speed, exhaust-gas recirculation flow rate, engine speed, engine temperature, engine load, compressor speed, and air/fuel ratio. Boost may be calculated via summing the boost provided by each of the compressor of the exhaust-gas turbocharger and the electrically driveable compressor.

The method 400 may proceed to 404 to determine if boost is desired. In some examples of the method 400, additionally or alternatively, if boost is already desired, then 404 may include determining if an amount of boost desired has increased. Boost may be desired during transient engine operating conditions, such as a pedal tip-in, high loads, or the like. If boost is not desired, then the method 400 may proceed to 406 to maintain current operating parameters and does not increase boost to the engine. In some examples, this may further include, additionally or alternatively, bypassing one or more of the compressor of the exhaust-gas turbocharger and the electrically driveable compressor.

If boost is desired, then the method 400 may proceed to 408 to compress intake air with the compressor of the exhaust-gas turbocharger. As such, exhaust gases generated via the engine, that are not rerouted as high-pressure EGR, may spin a turbine and provide a corresponding amount of boost. As such, boost provided by the compressor of the exhaust-gas turbocharger may be directly proportional to an amount of exhaust gas flowing to the turbine.

The method 400 may proceed to 410 to determine if a boost demand is met by the compressor of the exhaust-gas turbocharger. If the boost demand is met by the compressor of the exhaust-gas turbocharger, then the method 400 may proceed to 412 to maintain current operating parameters and does not flow or increase compressed air flow to the electrically driveable compressor. By doing this, fuel economy may be increased as a battery state of charge may not be drained to power an electric motor.

In the example of FIG. 2A, this may include maintaining a position of the each of the first and second shut-off elements 242, 244 so that amounts of compressed air flowing to the electrically driven compressor and the bypass remain unchanged. In the example of FIG. 2B, this may include maintaining a position of the single shut-off element 252 so that amounts of compressed air flowing to the electrically driven compressor and the bypass remain unchanged.

Returning to 410, if the boost demand is not met by the compressor of the exhaust-gas turbocharger, then the method 400 may proceed to 414 to flow and/or increase compressed air flow to the electrically driveable compressor. As such, the compressor of the exhaust-gas turbocharger may be providing as much compressed air as possible under current engine operating conditions, which may be insufficient to completely meet the desired amount of boost. In this way, the electric motor may be activated to spin the electrically driven compressor to further compress compressed air from the compressor of the exhaust-gas turbocharger to meet the boost demand. While battery state of charge is consumed to operate the electrically driveable compressor, fuel economy savings obtained from operating both the compressors may outweigh the electrical energy consumed while providing a desired power output.

In the example of FIG. 2A, increasing compressed air flow to the electrically driveable compressor may include actuating the first shut-off element 242 to a more open position and actuating the second shut-off element 244 to a more closed position. In the example of FIG. 2B, increasing compressed air flow to the electrically driveable compressor may include actuating the single shut-off element 252 to a position where the opening of the first arm-like duct 232 is more open and the opening of the second arm-like duct 234 is more closed, thereby increasing compressed air flow to the electrically driveable compressor and decreasing compressed air flow to the bypass.

The method 400 to 416, which may include continuing to flow compressed air to the electrically driveable compressor until the compressor of the exhaust-gas turbocharger can meet the boost demand. In some examples, turbo lag may occur as more boost is desired, wherein the compressor of the exhaust-gas driven turbocharger may not be able to meet the boost demand for a short duration of time (e.g., less than 10 seconds). As such, the electrically driveable compressor may only be activated during the duration of time until the compressor of the exhaust-gas turbocharger is up to speed and meeting the boost demand.

In this way, a compressor housing for a compressor of an exhaust-gas turbocharger may comprise a plurality of outlets, wherein the plurality of outlets comprises at least a first outlet directing compressed air to an electrically driveable compressor and a second outlet directing compressed air to a bypass. The electrically driveable compressor may be activated during engine conditions where the compressor of the exhaust-gas turbocharger may not meet a boost demand when providing as much boost as possible. The technical effect of arranging more than one outlet in the compressor housing is to decrease packaging constraints, pressure loss due to increased piping, and decrease manufacturing costs due to less material being used.

An embodiment of a supercharged internal combustion engine comprising an intake system shaped to supply charge air, an exhaust-gas discharge system shaped to discharge exhaust gas, at least one exhaust-gas turbocharger which comprises a turbine arranged in the exhaust-gas discharge system and a compressor arranged in the intake system, the compressor being equipped with at least one impeller which is arranged on a rotatable shaft in a compressor housing, and the compressor housing having a charge-air-conducting flow duct which extends from an inlet region of the compressor and extends downstream of the at least one impeller, and an electrically driveable compressor, which is arranged in the intake system downstream of the compressor of the at least one exhaust-gas turbocharger, wherein the compressor housing has at least two outlets, the charge-air-conducting flow duct splitting downstream of the at least one impeller into at least two arm-like duct branches, where a first arm-like duct is fluidly coupled to a first outlet and a second arm-like duct is fluidly coupled to a second outlet, the first outlet directing compressed air from the compressor of the exhaust-gas turbocharger to the electrically driveable compressor and the second outlet bypassing the electrically driveable compressor. A first example of the supercharged internal combustion engine further includes where the charge-air-conducting flow duct splits downstream of the at least one impeller into the first and second arm-like duct branches, and where a junction is arranged between the first and second arm-like duct branches. A second example of the supercharged internal combustion engine, optionally including the first example, further includes where a single shut-off element is arranged at the junction and shaped to adjust compressed air flow to each of the first and second arm-like duct branches. A third example of the supercharged internal combustion engine, optionally including the first and/or second examples, further includes where the first arm-like duct branch comprises a first shut-off element and where the second arm-like duct branch comprises a second shut-off element. A fourth example of the supercharged internal combustion engine, optionally including one or more of the first through third examples, further includes where an intercooler arranged between the compressor of the exhaust-gas turbocharger and the electrically driveable compressor and a charge-air cooler arranged downstream of each of the compressor of the exhaust-gas turbocharger and the electrically driveable compressor.

An embodiment of a system comprising a compressor of an exhaust-gas turbocharger comprising a compressor housing comprising a plurality of outlets including at least a first outlet and a second outlet, and where the first outlet is shaped to direct compressed air from the compressor to an electrically driveable compressor and where the second outlet is shaped to bypass compressed air away from the electrically driveable compressor. A first example of the system further includes where a controller with computer-readable instructions stored on non-transitory memory thereof that when executed enable the controller to adjust a shut-off element shaped to adjust compressed air flow to the first outlet to increase compressed air flow to the electrically driveable compressor in response to an amount of boost provided by the compressor of the exhaust-gas turbocharger being less than an amount of boost desired. A second example of the system, optionally including the first example, further includes where the controller further comprises instructions enabling the controller to adjust the shut-off element to decrease compressed air flow to the electrically driveable compressor in response to the amount of boost provided by the compressor of the exhaust-gas turbocharger being equal to the amount of boost desired. A third example of the system, optionally including the first and/or second examples, further includes where the compressor of the exhaust-gas turbocharger is larger than the electrically driveable compressor. A fourth example of the system, optionally including one or more of the first through third example, further includes where the first outlet is separated from the second outlet, and where compressed air in the first outlet does not mix with compressed air in the second outlet. A fifth example of the system, optionally including one or more of the first through fourth examples, further includes where the compressor of the exhaust-gas turbocharger is arranged along a single intake passage, and where the electrically driveable compressor and the bypass are arranged downstream of the compressor of the exhaust-gas turbocharger in the single intake passage. A sixth example of the system, optionally including one or more of the first through fifth examples, further includes where an intercooler arranged between the compressor of the exhaust-gas turbocharger and the electrically driveable compressor, and where only compressed air flowing through the first outlet flows to the intercooler. A seventh example of the system, optionally including one or more of the first through sixth examples, further includes where a charge-air cooler arranged in the single intake passage downstream of each of the electrically driveable compressor and the bypass, and where compressed air flowing out of each of the electrically driveable compressor and the bypass flows to the charge-air cooler.

A method comprising flowing charge-air to a compressor of an exhaust-gas turbocharger to provide an amount of boost in response to a boost demand, adjusting a shut-off element arranged in a housing of the compressor to flow air compressed by the compressor to a first outlet arranged in the housing in response to the amount of boost being less than an amount of boost demanded, and where the first outlet directs the compressed air to an electrically driveable compressor, and adjusting the shut-off element arranged in the housing of the compressor to flow air compressed by the compressed to a second outlet arranged in the housing in response to the amount of boost being equal to the amount of boost demanded, and where the second outlet bypasses the electrically driveable compressor. A first example of the method further includes where adjusting the shut-off element to flow the compressed air to the electrically driveable compressor further includes activating an electric motor to spin the electrically driveable compressor. A second example of the method, optionally including the first example, further includes where the first outlet and the second outlet are adjacent to each other. A third example of the method, optionally including the first and/or second examples, further includes where the housing comprises no additional inlets or other outlets other than an exhaust-gas turbocharger inlet, the first outlet, and the second outlet. A fourth example of the method, optionally including one or more of the first through third examples, further includes where compressed air flowing through the first outlet does not flow into or mix with air in the second outlet. A fifth example of the method, optionally including one or more of the first through fourth examples, further includes where flowing compressed air through the first outlet further includes flowing the compressed air through an intercooler before flowing the compressed air to the electrically driveable compressor. A sixth example of the method, optionally including one or more of the first through fifth examples, further includes where the shut-off element is a pivotable flap.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A supercharged internal combustion engine comprising:
    an intake system shaped to supply charge air;
    an exhaust-gas discharge system shaped to discharge exhaust gas;
    at least one exhaust-gas turbocharger which comprises a turbine arranged in the exhaust-gas discharge system and a compressor arranged in the intake system, the compressor being equipped with at least one impeller which is arranged on a rotatable shaft in a compressor housing, the compressor housing having a charge-air-conducting flow duct which extends from an inlet region of the compressor and extends downstream of the at least one impeller; and
    an electrically driveable compressor, which is arranged in the intake system downstream of the compressor of the at least one exhaust-gas turbocharger, wherein the compressor housing has at least two outlets, the charge-air-conducting flow duct splitting downstream of the at least one impeller into at least two arm-like duct branches, where at least one shut-off element is arranged at a junction of the at least two arm-like duct branches including a first arm-like duct fluidly coupled to a first outlet and a second arm-like duct fluidly coupled to a second outlet, the first outlet directing compressed air from the compressor of the at least one exhaust-gas turbocharger to the electrically driveable compressor and the second outlet to a bypass passage bypassing the electrically drivable compressor, wherein the at least one shut-off element is adjustable via controller in a first mode to block only the compressed air to the electrically drivable compressor and in a second mode to block only the bypass passage.

2. The supercharged internal combustion engine of claim 1, wherein the at least one shut-off element is a single shut-off element arranged at the junction and adjustable to direct the compressed air flow to only one of the first or second arm-like duct branches.

3. The supercharged internal combustion engine of claim 1, wherein the first arm-like duct branch comprises a first shut-off element arranged at the junction and where the second arm-like duct branch comprises a second shut-off element arranged at the junction, and wherein the first and second shut-off elements are adjustable to prevent flow through each of the first and second arm-like duct branches.

4. The supercharged internal combustion engine of claim 1, further comprising an intercooler arranged between the compressor of the at least one exhaust-gas turbocharger, wherein compressed air flowing through the bypass passage does not travel through the intercooler.

5. A system comprising:
    a compressor of an exhaust-gas turbocharger comprising a compressor housing having a plurality of outlets including a first outlet and a second outlet, and where at least one shut off-element is arranged at a junction of a first duct leading to the first outlet and a second duct leading to the second outlet, wherein the first outlet directs compressed air from the compressor to an electrically driveable compressor and the second outlet directs compressed air through a bypass passage to bypass the electrically driveable compressor, wherein the at least one shut-off element is adjustable via controller in a first mode to block only the compressed air to the electrically drivable compressor and in a second mode to block only the bypass passage.

6. The system of claim 5, further comprising a controller with computer-readable instructions stored on non-transitory memory thereof that, when executed, enable the controller to adjust the at least one shut-off element to adjust compressed air flow to the first outlet to increase compressed air flow to the electrically driveable compressor in response to an amount of boost provided by the compressor of the exhaust-gas turbocharger being less than an amount of boost desired.

7. The system of claim 6, wherein the controller further comprises instructions enabling the controller to adjust the at least one shut-off element to decrease the compressed air flow to the electrically driveable compressor in response to the amount of boost provided by the compressor of the exhaust-gas turbocharger being equal to the amount of boost desired.

8. The system of claim 5, wherein the compressor of the exhaust-gas turbocharger is larger than the electrically driveable compressor.

9. The system of claim 5, wherein the first outlet is separated from the second outlet, and wherein compressed air flowing through one of the first or second duct does not mix with compressed air in the other of the first or second duct.

10. The system of claim 5, wherein the compressor of the exhaust-gas turbocharger is arranged along a single intake passage, and wherein the electrically driveable compressor and the bypass passage are arranged downstream of the junction of the compressor housing.

11. The system of claim 10, further comprising an intercooler arranged between the compressor of the exhaust-gas turbocharger and the electrically driveable compressor, wherein only compressed air flowing through the first outlet flows through the intercooler.

12. The system of claim 10, further comprising a charge-air cooler arranged in the single intake passage downstream of each of the electrically driveable compressor and the bypass passage, wherein compressed air flowing out of each of the electrically driveable compressor and the bypass passage flows to the charge-air cooler.

13. A method comprising:
    flowing charge-air to a compressor of an exhaust-gas turbocharger to provide an amount of boost in response to a boost demand;
    adjusting via controller a shut-off element arranged at a junction of a first duct and a second duct of a housing of the compressor to flow air compressed by the compressor through the first duct to a first outlet arranged in the housing and seal the second duct with the shut-off element in response to the amount of boost being less than an amount of boost demanded, wherein the first outlet directs the compressed air to a passage to an electrically driveable compressor; and
    adjusting via the controller the shut-off element to flow air compressed by the compressor through the second duct to a second outlet arranged in the housing and seal the first duct with the shut-off element in response to the amount of boost being equal to the amount of boost demanded, wherein the second outlet directs the compressed air to a bypass passage which bypasses the electrically driveable compressor.

14. The method of claim 13, wherein adjusting the shut-off element to flow the compressed air to the electrically driveable compressor further includes activating an electric motor to spin the electrically driveable compressor.

15. The method of claim 13, wherein the first outlet and the second outlet are adjacent to each other and the bypass passage and the passage to the electrically driveable compressor only connect downstream of the electrically driveable compressor.

16. The method of claim 13, wherein the housing comprises no additional inlets or other outlets other than an exhaust-gas turbocharger inlet, the first outlet, and the second outlet.

17. The method of claim 13, wherein compressed air flowing through the first or second duct does not flow into or mix with air in the other of the first or second duct.

18. The method of claim 13, wherein flowing compressed air through the first outlet further includes flowing the compressed air through an intercooler before flowing the compressed air to the electrically driveable compressor.

19. The method of claim 13, wherein the shut-off element is a pivotable flap adjustable to seal off each of the first duct and the second duct.

20. The method of claim 13, further comprising adjusting the shut-off element to flow compressed air to a third duct connected to an intercooler.

* * * * *